United States Patent
Krishnan et al.

(10) Patent No.: US 7,792,031 B2
(45) Date of Patent: Sep. 7, 2010

(54) OPTIMAL FRAGMENTATION OF MULTICAST PACKETS

(75) Inventors: Suresh Krishnan, Montreal (CA); Frederic Rossi, Montreal (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 124 days.

(21) Appl. No.: 12/167,900

(22) Filed: Jul. 3, 2008

(65) Prior Publication Data

US 2010/0002697 A1    Jan. 7, 2010

(51) Int. Cl.
H04L 12/28 (2006.01)
H04L 12/56 (2006.01)

(52) U.S. Cl. ............. 370/230.1; 370/235; 370/351; 370/401; 370/474

(58) Field of Classification Search ............. None
See application file for complete search history.

(56) References Cited

U.S. PATENT DOCUMENTS

| | | | |
|---|---|---|---|
| 2003/0014662 A1* | 1/2003 | Gupta et al. | 713/200 |
| 2004/0088430 A1* | 5/2004 | Busi et al. | 709/238 |
| 2005/0226239 A1* | 10/2005 | Nishida et al. | 370/389 |
| 2005/0246570 A1* | 11/2005 | Block et al. | 714/4 |
| 2006/0221844 A1 | 10/2006 | Subramanian et al. | |
| 2007/0115963 A1 | 5/2007 | Vadlakonda et al. | |
| 2007/0211723 A1* | 9/2007 | Patel et al. | 370/392 |
| 2008/0165775 A1* | 7/2008 | Das et al. | 370/392 |
| 2008/0240123 A1* | 10/2008 | Cutaia | 370/401 |

OTHER PUBLICATIONS

Search of KR-624686 B1: "System and a Method for Setting a Maximum Packet Transmission Unit in an IPv6 Transit Tunnel by Using a Packet Too Big Message, Particularly for Preventing a Loss of a Packet by Previously Broadcasting a Packet-Too-Big Message", Sep. 19, 2006.
Fenner et al.: RFC 4601, "Protocol Independent Multicast—Sparse Mode (PIM-SM): Protocol Specification (Revised)", Aug. 2006.
M. Crawford: RFC 2019, "A Method for the Transmission of IPv6 Packets over FDDI Networks", Oct. 1996.

(Continued)

*Primary Examiner*—Chi H Pham
*Assistant Examiner*—Soon-Dong D Hyun
(74) *Attorney, Agent, or Firm*—Alex Nicolaescu; Ericsson Canada Inc.

(57) ABSTRACT

Methods, a data source and a router are provided to fragment packets that are to be sent in multicast mode towards a plurality of destinations comprised in a multicast group. Each router along a path leading from the data source towards some of the destinations sends its maximum transmission unit value in an uplink direction. Each router directly connected to the data source calculates a lowest maximum transmission unit based on various maximum transmission unit values received from downstream routers. The data source receives from each of the directly connected routers a maximum transmission unit value, which is certain to be acceptable to all routers and destinations of the multicast group downstream of that directly connected router. The data source selects a lowest one of the received maximum transmission unit values and fragments data contents accordingly.

8 Claims, 8 Drawing Sheets

OTHER PUBLICATIONS

McCann, Deering & Mogul: RFC 1981, "Path MTU Discovery for IP version 6", Aug. 1996.

Author Name Unknown: "Method to Improve Multicast Path MTU Discovery"; IP.COM Journal, IP.COM Inc., West Henrietta, NY, USA, Oct. 11, 2004, XP13021786AI, pp. 1-2.

T. Nartem et al.: "Neighbor Discovery for IP Version 6 (IPv6)"; Network Working Group, RFC 4861, Sep. 2007, XP015052407AI, pp. 1-97.

M. Mathis et al.: "Packetization Layer Path MTU Discovery", Network Working Group, RFC 4821, Mar. 2007, XP015050669AI, pp. 1-32.

International Search Report from corresponding PCT Application No. PCT/IB2009/052693.

* cited by examiner

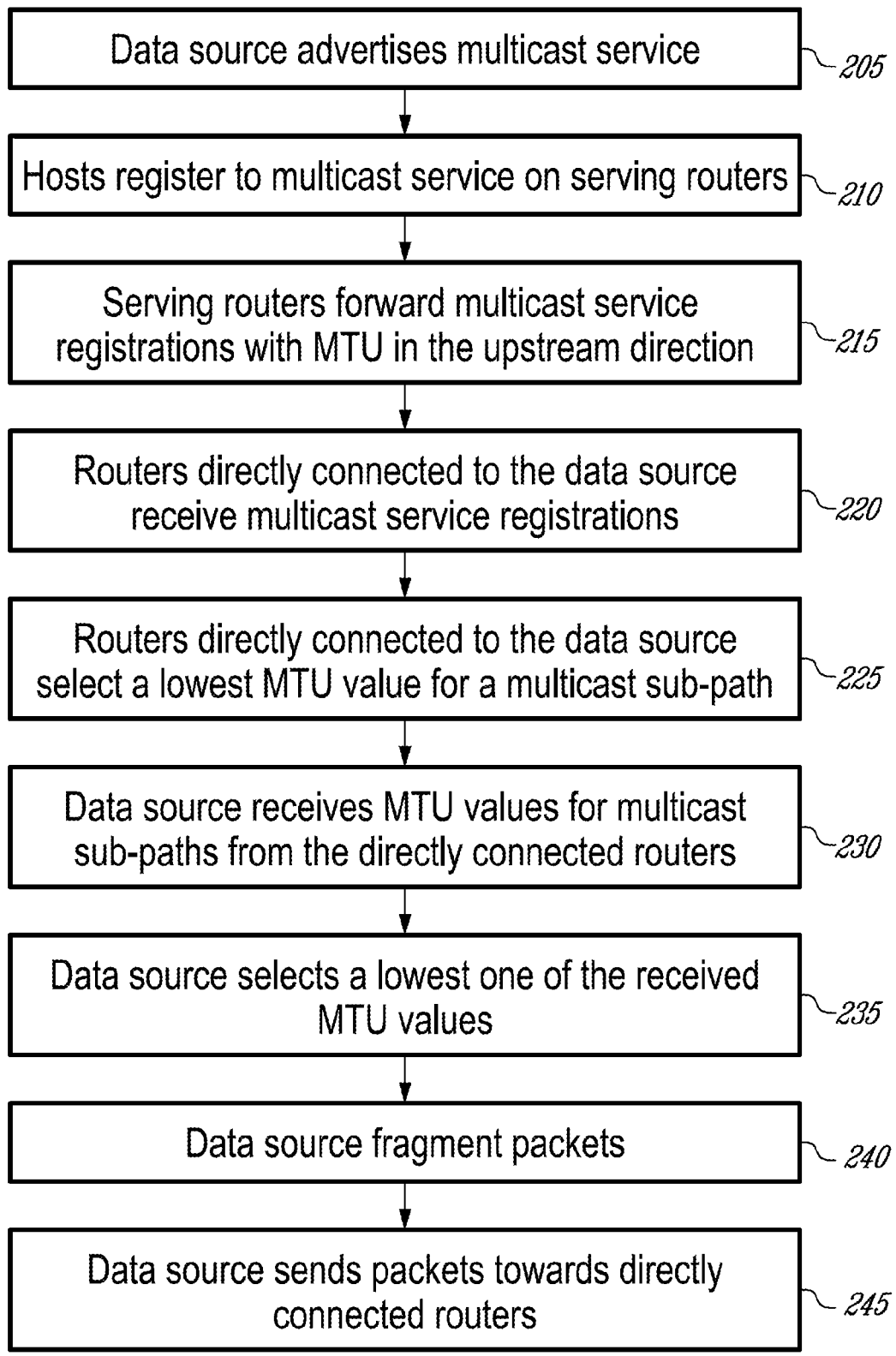
FIG_2

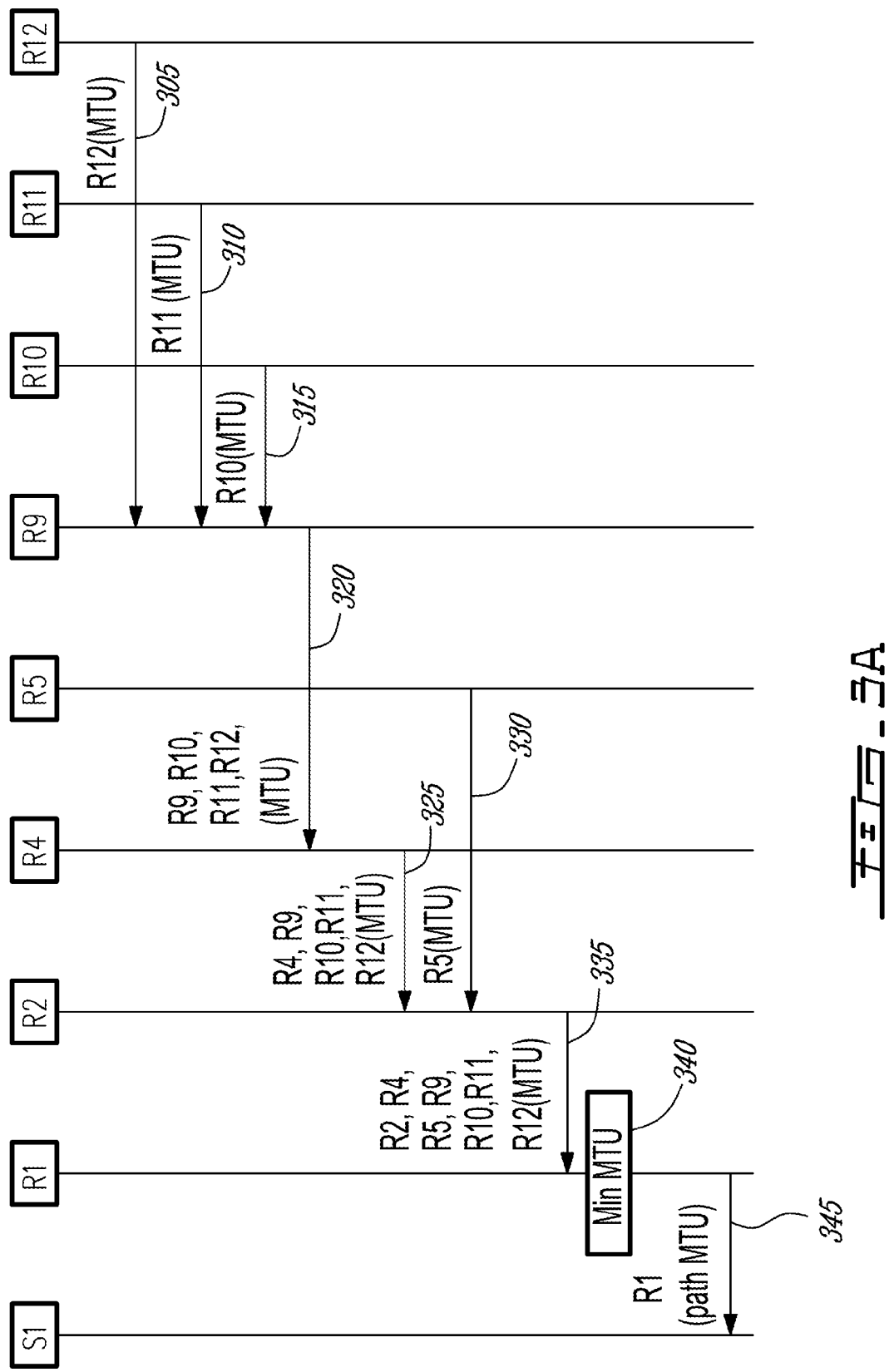

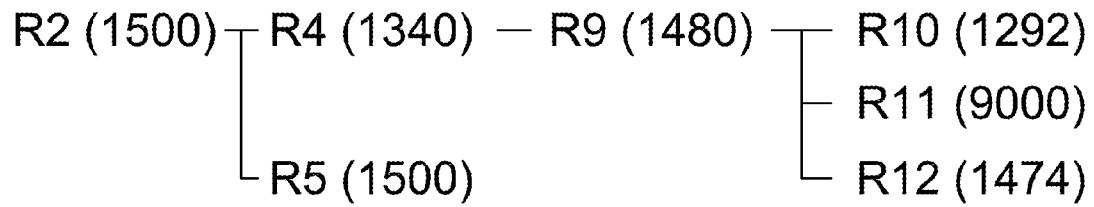
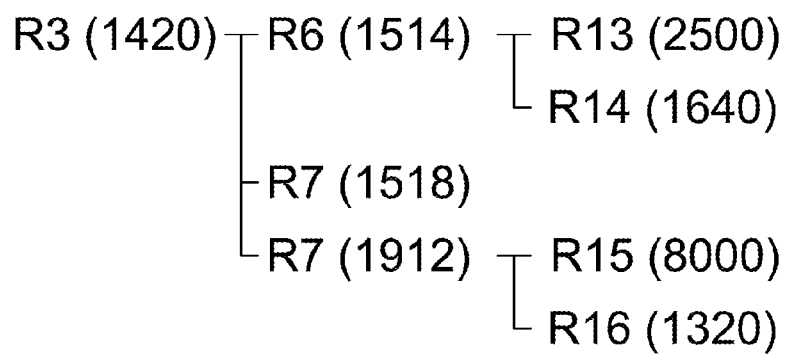
FIG. 7
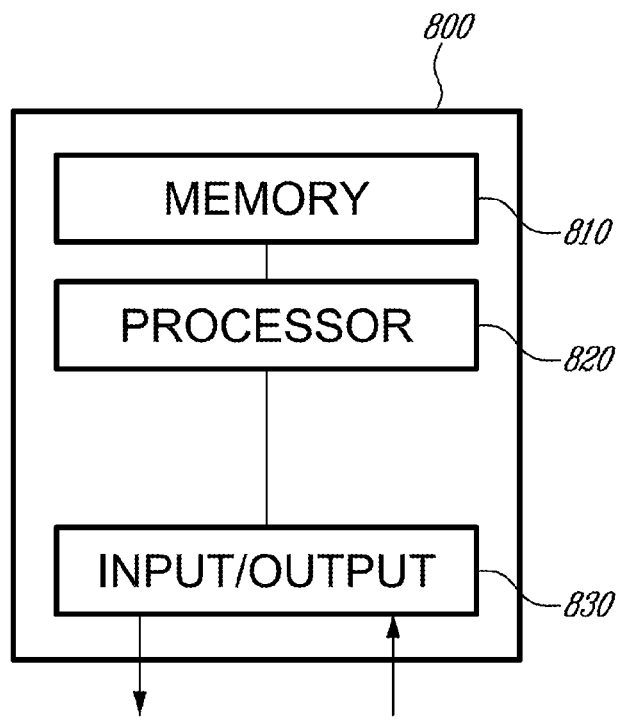
FIG. 8

OPTIMAL FRAGMENTATION OF MULTICAST PACKETS

TECHNICAL FIELD

The present invention relates generally to the field of communications and, more specifically, to methods and nodes for fragmenting packets for multicast transmission.

BACKGROUND

Using packet data transmission techniques, information is sent between nodes in the form of data packets. Packets can be of various sizes and, for some types of communication, a complete content may be sent as one single packet. This may be the case, for example, of the act of sending a web page from a web server to a web browser, if the page is simple and has a small content. For a large number of applications, contents need to be fragmented into multiple packets that are amenable for packet transmission, for reasons that are well-known in the art. A receiver of such contents reassembles packets after receiving them.

Various servers, routers and hosts may be capable of sending, receiving or transmitting packets of various sizes. While a sender may be capable of producing very large packets, a destination of those packets or some intervening nodes may only be capable of handling smaller packets. According to the Internet Protocol version 4 (IPv4), when a sender sends a packet of a given size towards a receiver, if an intermediate router cannot carry the packet further because of its size, the intermediate router may fragment the packet into two or more smaller packets, in which case the packets are reassembled at their destination. According to the Internet Protocol version 6 (IPv6), intermediate routers are not allowed to fragment packets. The sender of a content must therefore determine, a priori, what may be an acceptable packet size along a path leading to a destination of the packet. Of course, a sender could fragment a content into very small packets and thereby ensure that the packet size is acceptable to any node towards the destination. However, such an approach would be very inefficient in using network resources.

The Internet Engineering Task Force (IETF) has published a Request For Comments (RFC) number 1981, entitled "Path MTU Discovery for IP version 6", wherein MTU stands for Maximum Transmission Unit. The RFC describes a technique for discovering a maximum allowable packet size—the MTU—that can be allowed on a given path or link. The method involves sending from a data source, on the path of interest, a probe packet, preferably of a large size, and determining whether a Packet Too Big message is received. This message, sent by one of the nodes along the path to indicate that the packet was dropped because of its size, carries a MTU for the node having sent it. The data source then sends another probe packet, sized according to the received MTU value. That new probe packet may arrive at its destination, or may be blocked at some further point along the path, in which case that point sends another Packet Too Big message with another, lower MTU value. The process continues until a probe packet of an acceptable size reaches its destination, in which case no Packet Too Big message is returned to the sender. Thereafter, the data source has learned the MTU for the path and can use its value for sending packets along that path.

For multicast services, a data source needs to send packets towards multiple destinations, oftentimes through distinct paths. The Path MTU Discovery method of RFC 1981 does not provide good performance when a number of MTU sizes applicable to several paths need to be known for purposes of multicast services. This is because the data source needs to obtain MTU values for each of a number of multicast paths individually, and then select the lowest of all the discovered MTU values. This requires a multiplicity of probe packets being sent along all multicast paths. This is a slow process that delays startup of a multicast service and that consumes a lot of valuable bandwidth.

SUMMARY

There would be clear advantages of having methods and nodes for ensuring that a source of multicast packet data is rapidly informed of the optimal maximum transmission unit value that can be accepted by all destinations part of a multicast group. Such methods and nodes should not rely on any wastage of valuable network bandwidth.

It is therefore a broad object of this invention to provide methods, a data source and a router for evaluating and propagating lowest maximum transmission unit values from various destinations through routers and all the way towards the data source, and for fragmenting multicast contents according to an optimally selected maximum transmit unit values.

A first aspect of the present invention is directed a method for fragmentation of multicast packets. The method comprises a step of receiving at a data source, from each of one or more routers, a maximum transmission unit value. The data source selects a lowest one of the received maximum transmission values. The data source then sends, through the one or more routers, multicast packets fragmented according to a size not exceeding the lowest maximum transmission unit value.

A second aspect of the present invention is directed to a data source for multicast transmission. The data source comprises a memory adapted to store a multicast table. The multicast table itself comprises one or more multicast groups. The data source also comprises an input-output device for receiving, from a given router, a maximum transmission unit value for members of a given multicast group reachable through the given router. The input-output device can also send data packets. The data source further comprises a processor. When the input-output device receives the maximum transmission unit value for the given router, the processor stores that maximum transmission unit value in the multicast table in relation with the given router and with the given multicast group. Thereafter, the processor selects a lowest one of one or more maximum unit transmission values for corresponding one or more routers for the given multicast group. The processor then fragments a content in data packets not exceeding in size the lowest maximum unit transmission value. The processor requests the input-output device to send the data packets through the one or more routers towards the given multicast group.

A third aspect of the present invention is directed to a method, implemented in a router, for propagating maximum transmission unit information. One or more maximum transmission unit values associated with each of one or more downstream routers are received. The method selects a lowest one of the one or more maximum transmission unit values and forwards the selected value towards the data source.

A fourth aspect of the present invention is directed to a router. The router stores in a memory, for a multicast group, one or more downstream router identities. The one or more downstream router identities are associated in the memory with maximum transmission unit values for those downstream routers. The router has an input-output device that receives from the one or more downstream routers the maximum transmission unit values, and that sends towards the data source a selected maximum transmission unit value. A processor receives from the input-output device the maximum transmission unit values for the downstream routers, stores those values in the memory, selects a lowest one of the received maximum transmission unit values, and requests the input-output device to send the selected maximum transmission unit value towards the data source.

BRIEF DESCRIPTION OF THE DRAWINGS

For a more detailed understanding of the invention, for further objects and advantages thereof, reference can now be made to the following description, taken in conjunction with the accompanying drawings, in which:

FIG. 2 illustrates an exemplary method for optimal fragmentation of multicast packets, as per some of the teachings of the present invention;

FIGS. 3a and 3b show an exemplary sequence for propagating maximum transmission unit values, as per some of the teachings of the present invention;

FIG. 7 shows an exemplary data structure implemented in various routers implemented according to the present invention; and FIG. 8 shows an exemplary router according to an aspect of the present invention.

DETAILED DESCRIPTION

The innovative teachings of the present invention will be described with particular reference to various exemplary uses and aspects of the preferred embodiment. However, it should be understood that this embodiment provides only a few examples of the many advantageous uses of the innovative teachings of the invention. In general, statements made in the specification of the present application do not necessarily limit any of the various claimed aspects of the present invention. Moreover, some statements may apply to some inventive features but not to others. In the description of the figures, like numerals represent like elements of the invention.

The present invention provides a method for optimally fragmenting a content intended for delivery to a multicast group, a method for propagating maximum transmission unit (MTU) values for the multicast group, a data source for fragmenting data packets in an optimal way, and a router for propagating the MTU values towards the data source. Various intervening routers present between the data source and a group of multicast destinations, towards which the data source intends to send data in a downstream direction, propagate MTU values in an upstream direction towards the data source. A lowest MTU value, representing a lower one of the MTU values in any part of a complete multicast path between the data source and all of the destinations, is discovered at the data source and used for fragmenting a multicast content. The methods and nodes of the present invention ensure that no data packet is rejected as being too large while at the same time the content is not fragmented into excessively small data packets.

In the context of the present invention, the data source may comprise any type of server providing audio, video, messaging or web services, and the like, towards multiple destinations. The method is of particular interest for implementation in Internet Protocol version 6 (IPv6) routers, but may also apply to Internet Protocol version 4 (IPv4) routers wherein it may be more efficient to fragment packets at the source rather than at intermediate routing points. Application of the present invention to IPv4 routers is of particular interest in cases where a network comprises both IPv4 and IPv6 routers. The method may also be applied in other types of routing nodes.

Figure 1:
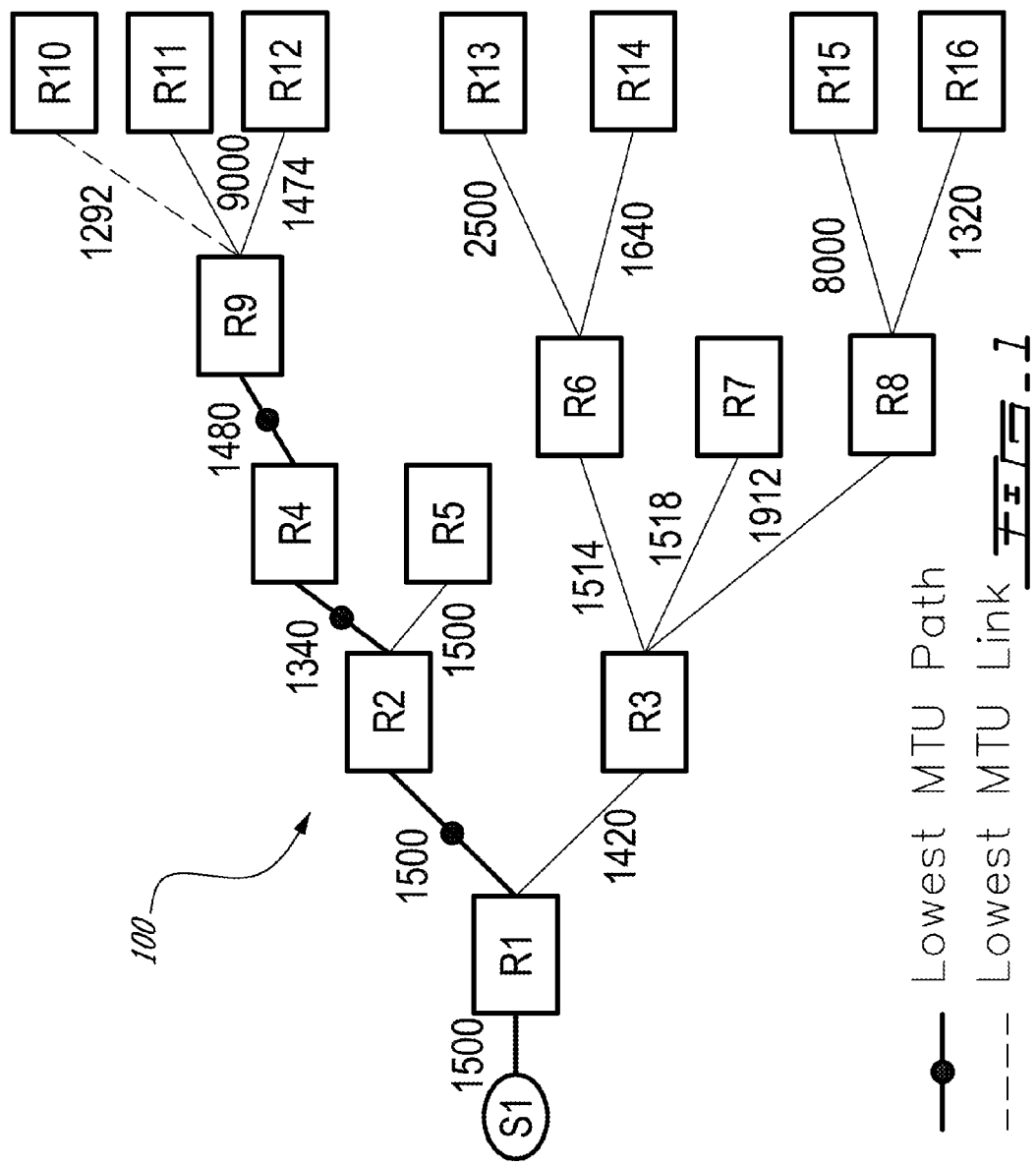
FIG. 1 shows an exemplary multicast network.

Reference is now made to the Drawings, in which FIG. 1 shows an exemplary multicast network. The network 100 comprises a data source S1 and routers R1-R16. Routers R5, R7, and R10-R16 provide access directly to destinations (not shown) of a multicast group. Routers R2-R4, R6, R8 and R9 are intermediate routers. Router R1 is directly connected to the data source. By "directly connected", those skilled in the art will understand that no element present between the router R1 and the data source may alter the MTU value on a link therebetween; generally, no node impacting the IP layer is to be found between two "directly connected" elements. Layer 2 switches or bridges may be found between two directly connected elements, as these do not operate on the IP layer. A numeric value between each pair of elements of FIG. 1 represents the MTU, or maximum packet size, expressed in bytes, that may be exchanged between two nodes of a pair. For example, a packet of up to 1500 bytes can be sent between the data source S1 and the router R1. This 1500-byte packet sent by S1 to R1 can be forwarded from R1 to R2 and then to R5. However, the 1500-byte packet cannot be forwarded from R1 to R3 because the MTU between R1 and R3 is of only 1420 bytes. Likewise, the 1500-byte packet, if initiated from S1, cannot travel all the way to R4 or further because the MTU between R2 and R4 is limited to 1340 bytes. Of all paths leading from the data source S1 to all of the destinations, the lowest MTU found on any path is defined by the link between R9 and R10, and is set at 1292 bytes.

Using the prior art method as defined in Request For Comments (RFC) number 1981 of the Internet Engineering Task Force (IETF), the data source S1 would send a first probe packet with a size of 1500 bytes, corresponding to the MTU value of its immediate outgoing route towards R1, the probe packet having a destination address of R5. S1 would need to wait for some period of time to determine whether or not a Packet Too Big message could be received from R5. The probe packet would be received without failure at R5, so no Packet Too Big message would be sent. S1 would then send another probe packet, with the same size, towards R7. R3 would respond with a Packet Too Big message, indicating that R3 cannot accept a packet that is larger than 1420 bytes. S1 would send another probe packet, sized at 1420 bytes, towards R7. That packet would reach R7. The process would continue until all of destinations R5, R7 and R10-R16 have been reached, at which time the lowest MTU path for the multicast group would have been set at 1292 bytes because that value, corresponding to the lowest MTU link between R9 and R10, is the absolute lowest MTU on any given link towards a member of the multicast group. If R10 eventually left the multicast group, the lowest MTU of any remaining member of the multicast group would now be 1320 bytes, corresponding to the link between R8 and R16. The data source S1 might not immediately be aware that R10 has left the group and, as a result, multicast packets would continue being sent with a 1292-byte size, at least until some new event occurs. According to RFC 1981, the data source S1 may occasionally send new probe packets which are larger than the lowest MTU, in order to determine whether some change in the network topology now allows using larger packets. Obviously, this feature of RFC 1981, which is intended to overcome some of its limitations related to changing network topologies, suffers from the same drawbacks of being slow and bandwidth consuming.

FIG. 2 illustrates an exemplary method for optimal fragmentation of multicast packets, as per some of the teachings of the present invention. The method starts at step 205 where the data content source broadcasts or advertises information about a multicast service that it intends to offer. This may for example take the form of a link on a web page, along with an indication that a given program or webcast will start on a given date and time. At step 210, various hosts or clients (not shown on FIG. 1) indicate to their serving routers (R5, R7, and R10-R16 on FIG. 1) their intent to be part of the multicast group. These registrations may, for example, be made by sending an Internet Group Management Protocol (IGMP) "join" message. The join message sent from the host may comprise a MTU value representative of a maximum packet size that the host can accept. At step 215, the serving routers forward multicast service registrations in an upstream direction leading towards the data content source. Manners of forwarding these service registrations are well-known and may follow, for example, a signaling method described in RFC 4601 "Protocol Independent Multicast—Sparse Mode (PIM-SM) Protocol Specification (Revised)" of the IETF. In addition to the prior art signaling means, the present invention adds to the forwarded service registrations MTU values for the serving routers and may further carry MTU values for the hosts.

There may be intervening routers between the serving routers directly connected to the hosts and other router or routers directly connected to the data content source. Each intervening router, such as R9, R4, R2, R6, R8 and R3, receives and then forwards the service registrations in the upstream direction towards the data content source, according to PIM-SM or to another similar protocol. As per the present invention, each intervening router forwards MTU values received from the serving routers and from any other intervening router along with its own MTU value. As this signaling propagates in the upstream direction, a multicast tree or sub-tree is built in each router directly connected to the data content source. The multicast tree or sub-tree comprises a complete picture of all routers, providing a multicast service to a plurality of hosts, located under a router that is directly connected to the data content source. The multicast tree or sub-tree, in the present invention, is complemented with MTU values for all paths between any two routers and between any serving router and its connected hosts. As taught herein, a complete multicast tree comprises all routers and hosts that are participating in a multicast service delivery when only one router is directly connected to the data content source. When more than one router is directly connected to the data content source for a same multicast service delivery, all routers and hosts connected downstream therefrom form a multicast sub-tree. The terms tree and sub-tree may be used interchangeably in the description of the present invention.

At step 220, one or more routers directly connected to the data content source, each of those routers being at the top of a multicast tree or sub-tree, receive multicast service registrations from routers, from hosts, or from a combination of both, found downstream in their trees or sub-trees. Service registrations may be received directly from directly connected downstream routers, or therethrough from further downstream routers. These service registrations provide the receiving routers with a complete picture of their trees or sub-trees, comprising router identities and MTU values. At step 225, the routers directly connected to the data content source each select a lowest one amongst the received MTU values. Preferably, the own MTU value of these routers are also factored in the selection. At step 230, the data source receives, from each of one or more directly connected routers, a MTU value. The MTU value received from a given router corresponds to the lowest MTU value found in the multicast tree or sub-tree between that given router and all destinations reachable therethrough. If the data source is directly connected to more than one router, it receives more than one MTU value. At step 235, the data source selects the lowest amongst the one or more received MTU values. At step 240, the data source fragments a data payload, of interest to the destinations of the multicast group, into packets having a size not exceeding the lowest MTU value. At step 245, the data source sends the fragmented packets, in multicast mode, through the one or more directly connected routers. Of course, the process of steps 240 and 245 may be an ongoing process wherein these two steps may be repeated for an extended period of time during which a service is delivered from the data source to the destinations. Later on, the data source may receive an updated MTU value at step 230. At that time, it reselects an updated lowest MTU value at step 235 and then uses it for fragmenting any remaining data payload.

Figure 3B:
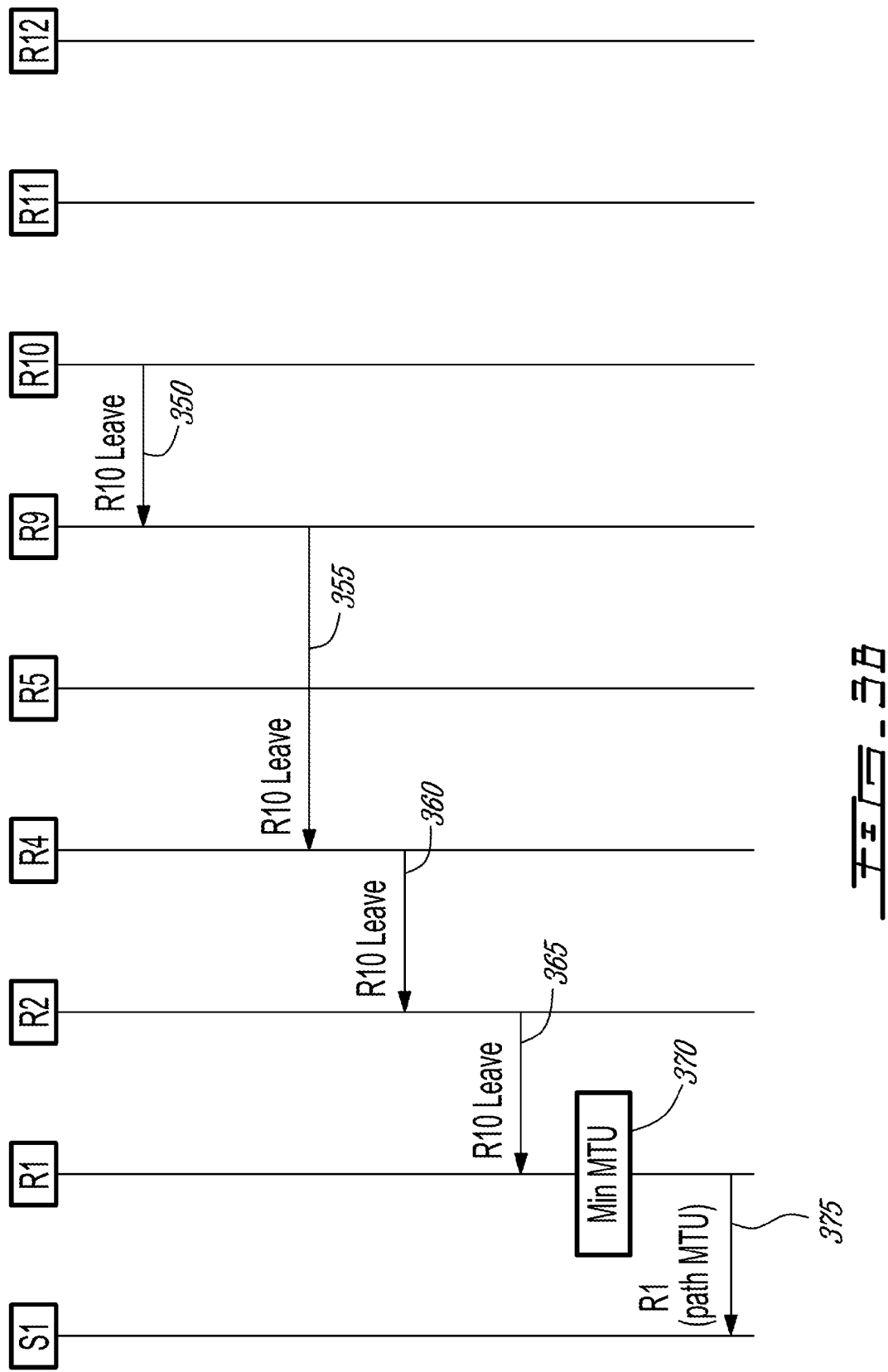

The method as described in relation to FIG. 2 will now be illustrated by its application to the network 100 of FIG. 1. FIGS. 3*a* and 3*b* show an exemplary sequence for propagating maximum transmission unit values, as per some of the teachings of the present invention. Only a part of the network 100 is shown for simplicity of the illustration, routers R3, R6-R8 and R13-R16 are not shown. Some of the steps of FIG. 2 are described further in FIGS. 3*a* and 3*b*. Having received information about the availability of a multicast service, hosts connected to routers R10, R11 and R12 have placed service registrations on those routers. Routers R10, R11 and R12 send upstream signals 305, 310 and 315 to R9. These signals forward the service registrations and also indicate that their MTU values are, respectively 1292, 9000 and 1474 bytes. R9 itself has an MTU of 1480. Having received signals 305, 310 and 315, R9 sends to R4 signal 320 carrying the service registrations and comprising the MTU values received from R10, R11 and R12. The signal 320 also adds R9's own MTU value. R4 sends signal 325 towards R2 carrying all the received MTU values as well as its own MTU value. In some embodiments, R9 may send distinct signals 320*a*, 320*b* and 320*c* towards R4 upon receiving signals 305, 310 and 315 from routers R12, R11 and R10. As the process of propagating MTU values continues, R2 eventually receives from R4 MTU values corresponding to R4, R9, R10, R11 and R12, and a value of 1500 bytes from R5 in signal 330. R2 sends those values and its own MTU value to R1 via signal 335. In a part of the network 100 not shown on FIGS. 3*a* and 3*b*, R3 sends MTU values for routers R6, R7, R8, R13, R14, R15 and R16 to R1. At step 340, R1 selects the minimum MTU value between its own value MTU value and all MTU values received through routers R2 and R3 for a whole multicast tree under it. It is to be noted that whether R1 receives router identities and corresponding MTU values directly, for example from routers R2 and R3, or indirectly from other routers through R2 and R3, all downstream routers and associated MTU values are considered by R1 in the selection of the lowest MTU value. R1 then sends in signal 345 a lowest MTU value of 1292 bytes to the data source S1, this value of 1292 corresponding to the lowest of all MTU link values presented to R1. Receipt of signal 345 at the data source S1 embodies step 230 of FIG. 2. Thereafter, the data source S1 fragments packets to a size not exceeding 1292 bytes.

If the data source S1 receives from a directly connected router information about hosts requiring access to a multicast service, said information being received without any MTU value, this is probably indicative that this directly connected router has not been updated to benefit from the teachings of the present invention. In such a case, the data source S1 may preferably allocate a default MTU value to that directly connected router. Likewise, a directly connected router may assign the default MTU value to any downstream router having not provided its own MTU value. The preferred default value is 1280 bytes because that value should be supported by any IPv6 standard compliant router.

Continuing on FIG. 3b, the router R10 sends towards R9 a "leave" signal 350 to indicate, using multicast terminology, that all of the one or more destinations supported by R10 have disconnected and should no longer be deemed a part of the multicast group. R9 sends signal 355 towards R4 to indicate that R10 has left the multicast group. Routers R2 and R1 in turn receive signals 360 and 365, which also indicate that router R10 has left the multicast group. At step 370, the router R1 calculates a new lowest MTU value equal to 1320 bytes, which is the value earlier received through from R3 and which represents the MTU value for the router R16. R1 sends signal 375 carrying this new R1 MTU value, which is received at the data source S1 at step 230 of FIG. 2. Thereafter, the data source S1 fragments packets to a size not exceeding 1320 bytes. The signal sent at step 375 may conditionally be sent, as the signal may be redundant in cases where the lowest MTU value selected at step 370 is equal to the one selected at step 340.

It should be noted that, in the network 100 of FIG. 1, the data source S1 is directly connected to only router R1, which implies that the data source S1 receives only one MTU value at step 230. This is of course only an illustration as in other networks, the data source S1 could be directly connected to more than one router and thus receive more than one MTU values.

The entire process of FIGS. 2, 3a and 3b does not require each endpoint router to send more than one single signal, unless a network event such as a host disconnecting changes the content of the multicast group. Each intermediate router only needs to receive one or more signals and add its own MTU value before sending one single signal. If some network topology change occurs, as when a destination is added or removed from a multicast group, very limited additional signaling is required. No large packet is necessary to determine the MTU of any link. The process is not guided by waiting for an eventual Packet Too Big signal, so it does not require any timeout and, as such, is much more rapid than in the prior art.

Figure 4:
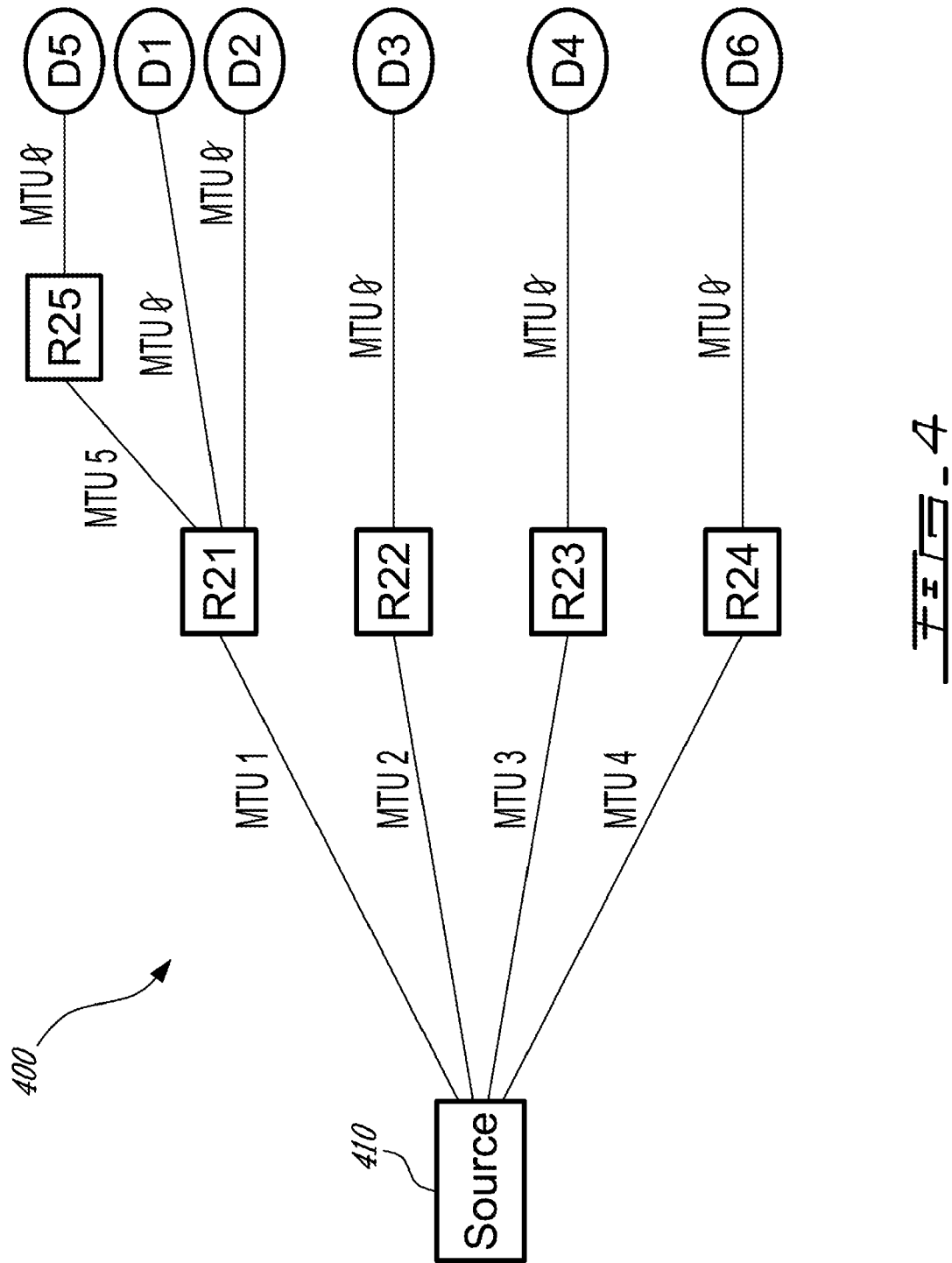
FIG. 4 shows another exemplary multicast network.

Considering FIG. 4 which shows another exemplary multicast network. The data source 410 may connect to six (6) distinct destinations D1-D6. The data source 410 is directly connected to 4 routers R21-R24. Connection from the data source towards the destinations is through one single router, except for the case of D5, which is connected to the data source 410 through the router R21 and through an intervening router R25. The network of FIG. 4 is greatly simplified for ease of illustration of the present invention. Exemplary MTU values may be compared according to the following relationships:

MTU4<MTU5
MTU5<MTU1
MTU2<MTU3
MTU2<MTU1

Figure 5:
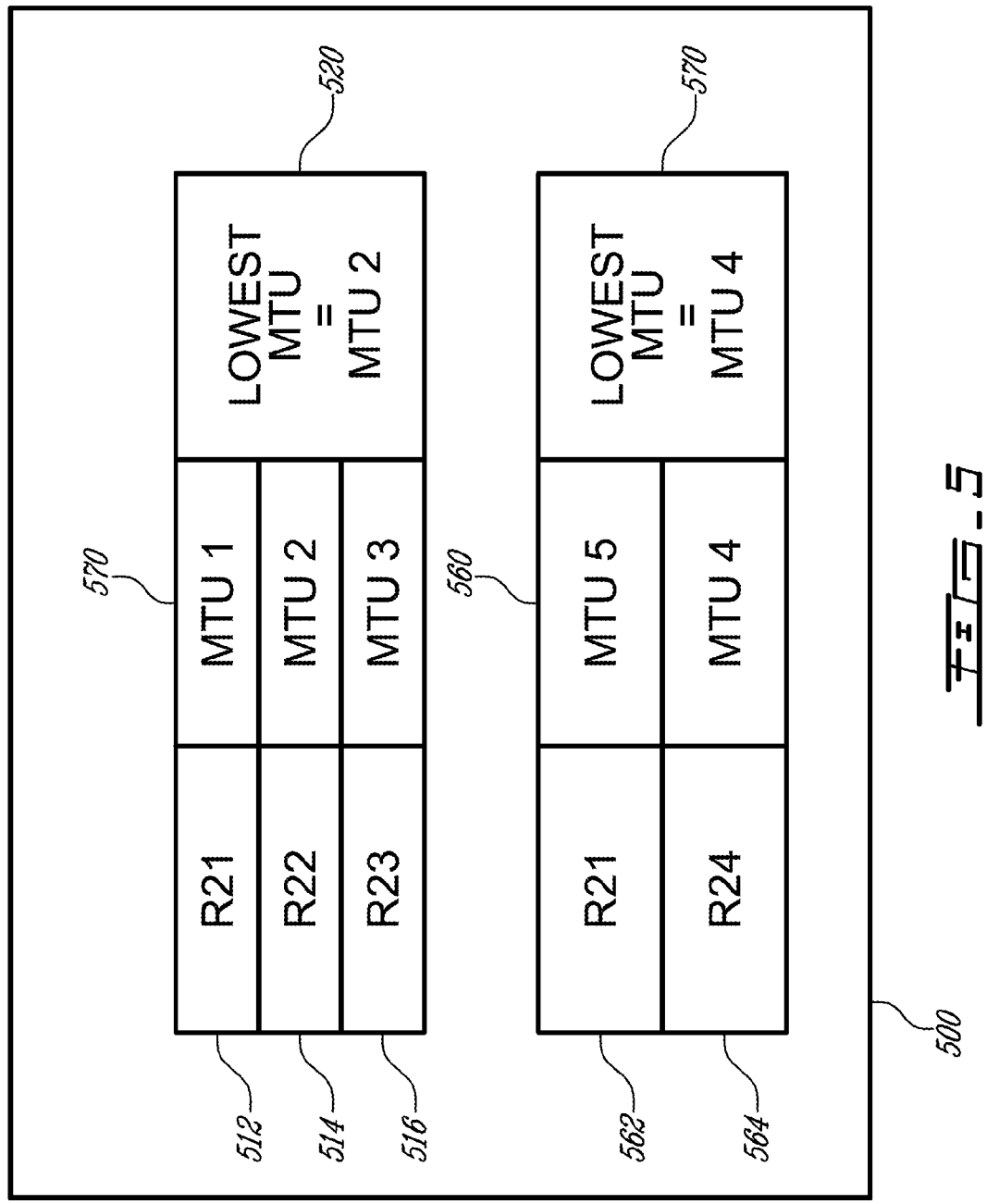
FIG. 5 shows an exemplary multicast group table found in a data source.

Moreover, for ease of illustration but without loss of generality, the value MTU0 is greater than any other MTU value on FIG. 4. This and the above relationships are of course exemplary and are thus shown for ease of illustration. FIG. 5 shows an exemplary multicast group table found in the data source 410. FIG. 5 illustrates the network of FIG. 4, and like that figure, is greatly simplified. A first multicast group 510 comprises destinations D1, D2, D3 and D4, connected to the data source 410 through routers R21, R22 and R23. A second multicast group 560 comprises destinations D1, D5 and D6, connected to the data source 410 through routers R21 and R24, D5 also being connected through an intervening router R25, which is not directly connected to the data source 410. In this example, D1 is part of both multicast groups. Multicast group 510 is represented by 3 rows 512-516, each of which corresponds to one router directly connected to the data source 410, each router serving at least one of the destinations, the routers being shown in a first column. A second column comprises an MTU value for that router. A separate lowest MTU field 520 stores a value for the multicast group, corresponding to the lowest MTU value in the second column of all rows 512-516 of the first multicast group 510.

Multicast group 560 is represented by 2 rows 562 and 564, each of which corresponds to one directly connected router supporting the multicast group 560. It can be observed that for R21 on row number 562, the MTU value is different from the MTU value for the same router R21 on row 512. The reason is that the router R21, which is used to link D1 and D5, has provided for this multicast group 560 a single MTU value, MTU5, corresponding to R25 in the path towards D5, this value being lower than MTU1. A separate lowest MTU field 570 stores the lowest MTU value found in the second column of rows 562-564, that is MTU4.

Figure 6:
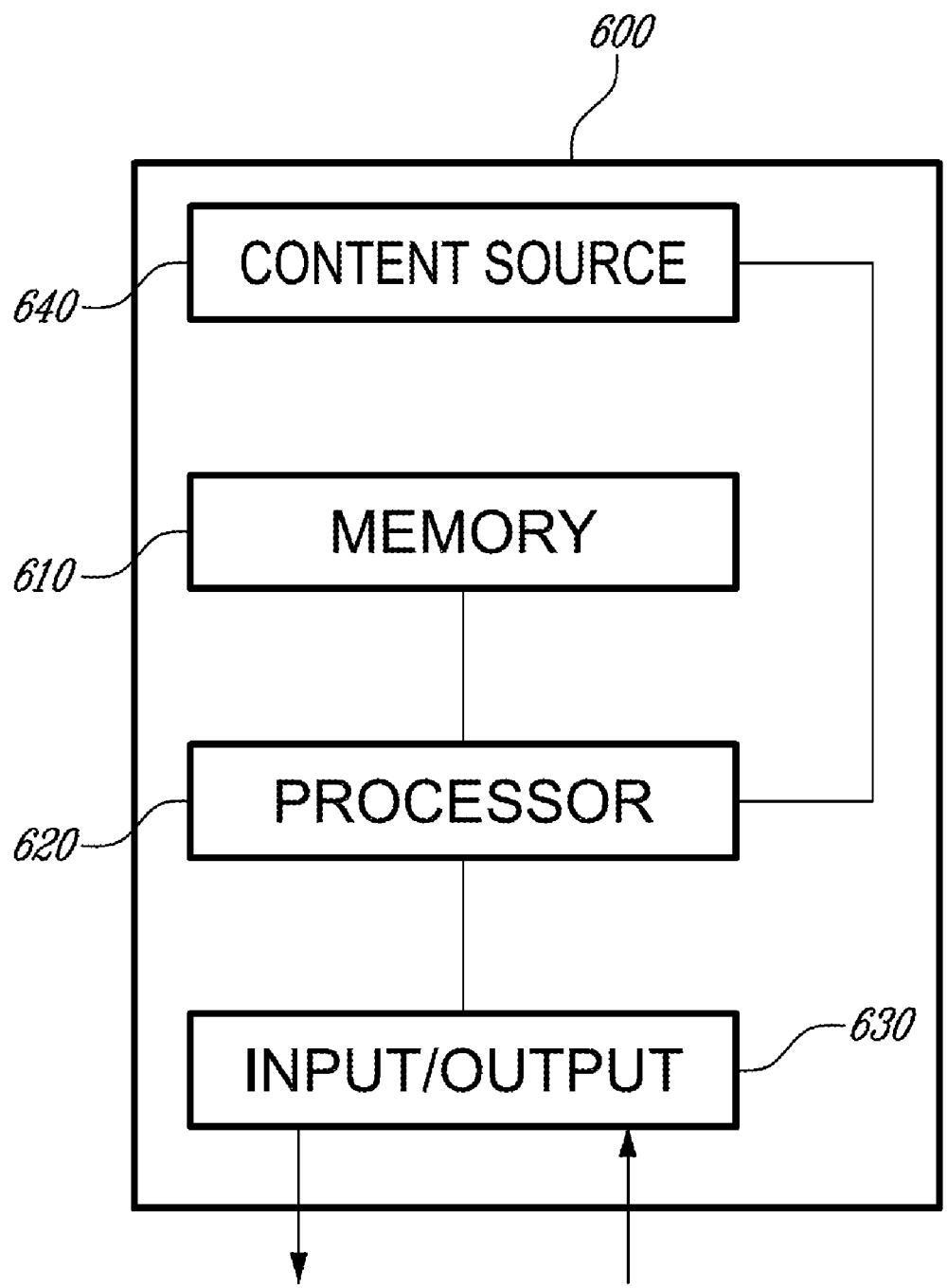
FIG. 6 shows an exemplary data source according to an aspect of the present invention.

An exemplary construction of a data source will now be described by reference to FIG. 6, which shows an exemplary data source according to an aspect of the present invention. The data source 600 comprises a memory 610, a processor 620, an input/output (I/O) device 630 and may comprise a content source 640. The memory 610 may be a volatile memory, or may alternatively be a non-volatile or persistent memory that can be electrically erased and reprogrammed and that may be implemented, for example, as a flash memory or as a data storage module. The content source 640 may be part of the memory 610, may be another memory element, or may be an intermediate component receiving a content from an external node (not shown) through the I/O port 630 or through another port (not shown). The I/O device 630 may be implemented as one single device or as distinct devices for receiving (input) and sending (output) signaling, messages and data. The data source 600 is connected towards one or more routers; means for connecting the data source 600 towards the routers may vary as, for example, connection towards one router might be on an Ethernet link while connection towards another router might be on an asynchronous transfer mode (ATM) link. Therefore the I/O device 630 may comprise a plurality of devices for connecting on a plurality of links of different types. Only one generic I/O device 630 is illustrated for ease of presentation of the present invention. The data source 600 may further comprise many more components, as is well-known in the art.

The memory 610 stores a multicast group table 500 as depicted in relation to FIG. 5. A list of directly connected routers serving a multicast group may be stored in the multicast group table 500 upon configuration of the data source 600, may be built upon receiving signals from the routers themselves or from an external node (not shown) through the I/O port 630 and stored in the memory 610 by the processor 620. The routers serving a multicast group are stored in the first column of a multicast group 510 or 560 in the multicast group table 500.

The data source 600 may advertise multicast services, such advertisements being used by hosts to request access to the services. Alternatively, an operator of the data source 600 may rely on other servers to advertise the services.

The I/O port 630 may receive from routers signals, each of which comprises an MTU value and an identity of the router having sent the signal. These signals have been sent from routers that are directly connected to the data source 600. The I/O port 630 transmits the signals' contents to the processor 620, which in turn stores in the memory 610 the router identities and the corresponding MTU values on rows of the multicast group table 500. The processor 620 then selects the lowest MTU value from all rows for a given multicast group and stores it in the table in the appropriate field, for example in the lowest MTU fields 520 or 570.

The processor 620 reads from the content source 640 a data content to be sent towards the members of a multicast group. It reads from the multicast table 500 in the memory 610 the lowest MTU value 520 or 570 applicable to this multicast group. It fragments the data content in packets not exceeding in size the applicable lowest MTU value and requests the I/O port 530 to transmit the packets.

FIG. 7 shows an exemplary data structure implemented in routers built according to the present invention. A data structure, or database, may be implemented in the router R1 of FIG. 1 and in the routers R21-R24 of FIG. 4. One such data structure is implemented in each router directly connected to a data source, for every multicast group for which the router receives multicast path information. The data structure comprises identities of one or more downstream routers along the multicast path from the directly connected router all the way to one or more destinations. The data structure may directly point to a destination if that destination is directly connected to this router. The data structure may also comprise a combination of routers and destinations. FIG. 7 specifically exemplifies a data structure found in the router R1 of FIG. 1. The data structure 700 provides a view of the network 100 of FIG. 1, highlighting the various paths to the routers connected to R1. As such, the data structure highlights each router found on each sub-path, in relation with corresponding MTU values. The data structure 700 is built and updated as R1 receives signals as shown on FIGS. 3a and 3b.

An exemplary construction of a router will now be described by reference to FIG. 8, which shows an exemplary router according to an aspect of the present invention. The router 800 comprises memory 810, a processor 820 and an input/output (I/O) device 830. The memory 810 may be a volatile memory, or may alternatively be a non-volatile or persistent memory. The I/O device 830 may be implemented as one single device or as distinct devices for receiving (input) and sending (output) signaling, messages and data. The I/O device 830 may comprise a plurality of devices for connecting on a plurality of links of different types. The router 800 may further comprise many more components, as is well-known in the art. The memory 810 stores a data structure 700 as depicted in relation to FIG. 7. An own MTU for the router 800 may be stored permanently in the memory 810, or may be set by configuration or other means and may comprise a specific value for purposes of serving a given multicast group. In most embodiments, the own MTU is constant for every multicast group and is determined by hardware and/or software capabilities of the router. In some embodiments, an operator of the router may desire to depart from this principle and use distinct own MTU values for distinct multicast groups, for example in order to provide distinct grades of service to those groups.

The I/O port 830 may receive router information and corresponding MTU values from one or more downstream routers. The I/O port 830 informs the processor 820, which in turn stores the received router information and MTU values in the data structure 700. If a router identity is received without an MTU value, as may be the case if one of the downstream routers does not support the present invention, the processor 820 may store a default MTU value, preferably 1280 bytes, as the downstream router MTU value for that given router. The processor 820 selects a lowest value among the downstream router MTU values for all members of the multicast tree in the data structure 700, preferably also factoring in the own MTU for the router 800 in the selection process. The processor 820 then requests the I/O port 830 to send towards the data source a signal carrying the selected lowest MTU value for the multicast group and for the router 800.

Although several aspects of the preferred embodiment of the methods, of the data source, and of the router of the present invention have been illustrated in the accompanying Drawings and described in the foregoing Detailed Description, it will be understood that the invention is not limited to the embodiment disclosed, but is capable of numerous rearrangements, modifications and substitutions without departing from the teachings of the invention as set forth and defined by the following claims.

The invention claimed is:

1. A method implemented in a router for propagating maximum transmission unit information, the method comprising the steps of:
   receiving from one or more downstream routers maximum transmission unit values associated with each of the one or more downstream routers;
   storing in a database identities of the downstream routers in relation with the corresponding maximum transmission unit values;
   selecting a first lowest one of the one or more maximum transmission unit values;
   forwarding towards a data source the first selected lowest maximum transmission unit value;
   receiving from one of the downstream routers a leave message;
   removing the identity of the downstream router having sent the leave message and the corresponding maximum transmission unit value from the database; and
   selecting a second lowest one of one or more remaining maximum transmission unit values corresponding to remaining downstream routers.

2. The method of claim 1, wherein:
   in the step of selecting the first lowest one of the one or more maximum transmission unit values, the one or more maximum transmission unit values further comprise a maximum transmission unit value for the router.

3. The method of claim 1, further comprising the step of:
   if a given one of the one or more downstream router does not provide a maximum transmission unit value, assigning a default maximum transmission unit value for the given downstream router.

4. The method of claim 1, further comprising the step of:
   forwarding towards the data source the second selected lowest maximum transmission unit value.

5. The method of claim 1, further comprising the step of:
   if the second selected lowest maximum transmission unit value is not equal to the first selected lowest maximum transmission unit value, forwarding towards the data source the second selected lowest maximum transmission unit value.

6. A router, comprising:
   a memory for storing for a multicast group one or more downstream router identities associated with corresponding maximum transmission unit values;

an input-output device for:
- receiving from the one or more downstream routers the maximum transmission unit values,
- receiving from one of the downstream routers a leave message, and
- sending towards a data source selected maximum transmission unit values; and a processor for:
- receiving from the input-output device the maximum transmission unit values for the downstream routers,
- storing in the memory the maximum transmission unit values associated with the downstream routers,
- selecting a first lowest one of the received maximum transmission unit values,
- requesting the input-output device to send the first lowest received maximum transmission unit value towards the data source,
- receiving from the input-output device the leave message,
- removing the identity of the downstream router having sent the leave message and the corresponding maximum transmission unit value from the memory, and
- selecting a second lowest one of one or more remaining maximum transmission unit values corresponding to remaining downstream routers.

7. The router of claim 6, wherein:
the processor is further for assigning a default maximum transmission unit value if a given downstream router identity is received without a corresponding maximum transmission unit value.

8. The router of claim 6, wherein:
the processor is further for requesting the input-output device to send towards the data source the second lowest maximum transmission unit value.

* * * * *